United States Patent
Kubota et al.

(10) Patent No.: US 7,216,056 B2
(45) Date of Patent: May 8, 2007

(54) ACCESS LOG ANALYZER AND ACCESS LOG ANALYZING METHOD

(75) Inventors: Koji Kubota, Osaka (JP); Ikuhiro Ihara, Osaka (JP)

(73) Assignee: C-Live, Inc., Osaka (JP)

( * ) Notice: Subject to any disclaimer, the term of this patent is extended or adjusted under 35 U.S.C. 154(b) by 329 days.

(21) Appl. No.: 10/497,689

(22) PCT Filed: Jun. 12, 2002

(86) PCT No.: PCT/JP02/12806

§ 371 (c)(1),
(2), (4) Date: Jun. 4, 2004

(87) PCT Pub. No.: WO03/048973

PCT Pub. Date: Jun. 12, 2003

(65) Prior Publication Data

US 2006/0085667 A1   Apr. 20, 2006

(30) Foreign Application Priority Data

Dec. 6, 2001   (JP) .............................. 2001-373357

(51) Int. Cl.
*G06F 17/18* (2006.01)
*G06F 17/40* (2006.01)

(52) U.S. Cl. ...................... 702/179; 702/187; 709/224

(58) Field of Classification Search ................ 702/179, 702/180, 182, 183, 187, 188, 10, 186; 340/3.1, 340/3.9; 709/223–225
See application file for complete search history.

(56) References Cited

U.S. PATENT DOCUMENTS 6,021,438 A * 2/2000 Duvvoori et al. ........... 709/224

(Continued)

FOREIGN PATENT DOCUMENTS

EP   0 959 419 A2   11/1999

(Continued)

OTHER PUBLICATIONS

Takashi Hatayama et al.; "Shiko no Jikan Henka ni Taio shita Access Keiko Benseki Hoshki no Ichiteian" The Institute of Electronics; Information and Communication Engineers Kenkyu Hokoku (KBSE99-13), Aug. 1999; vol. 99, No. 253; pp. 4956.

(Continued)

*Primary Examiner*—Manuel L. Barbee
(74) *Attorney, Agent, or Firm*—Keating & Bennett, LLP

(57) ABSTRACT

An access log analyzer extracts significant information from an enormous amount of data of access logs of a Web server so as to appropriately display the result of analysis. The access log analyzer includes an FTP module for acquiring a log from a server to be analyzed, a pre-formatting module for pre-processing the acquired log, a pre-counting module for totaling preformatted data for each monitored item, a main diagnostic statement creating module for creating a main diagnostic statement for the monitored item of the pre-counted data, a sub-diagnostic statement creating module for creating a sub-diagnostic statement for data related to the main diagnostic statement, a diagnostic statement connecting module for connecting the diagnostic statements, and a dispatcher module for managing the execution of each of the modules. The diagnostic statement creating modules have the functions of calculating a Z value for a diagnosed item and then generating a diagnostic statement in a natural language if there is a variation larger than usual with reference to a diagnostic parameter describing a model of a diagnostic statement corresponding to the range of the Z value.

10 Claims, 14 Drawing Sheets

U.S. PATENT DOCUMENTS

| | | | |
|---|---|---|---|
| 6,341,310 B1 * | 1/2002 | Leshem et al. | 709/223 |
| 2002/0070953 A1 * | 6/2002 | Barg et al. | 345/700 |
| 2004/0019677 A1 * | 1/2004 | Fukumoto et al. | 709/224 |

FOREIGN PATENT DOCUMENTS

| | | |
|---|---|---|
| EP | 1 220 098 A2 | 7/2002 |
| JP | 10-124580 | 5/1998 |
| JP | 2000-40046 | 2/2000 |
| JP | 2001-282538 | 10/2001 |
| WO | WO 00/77647 A1 | 12/2000 |

OTHER PUBLICATIONS

Tsunoru Nakajima; "Web no Log Kaiseki Tool"; Nikkei Internet Technology; Aug. 1998; No. 14; pp. 122-129.

Yasuhiro Honma; "Seihin Survey: Log Kaiseki Soft/Service: Site no "Shichoritsu" o Bunseki Web Marketing ni Fukaketsu"; Nikkei Netbusiness; Jun. 1999; No. 48; pp. 72-77.

"Data Mining Tool 'Clementine6.0'"; Computer Telephony; Jun. 20, 2001; vol. 4, No. 7; pp. 100-101.

Pearrow, Mark; "Web site Usability Handbook"; K.K. Ohm; Apr. 25, 2001; pp. 223-249.

Nagata, Osamu; "Stat View, Introduction to Multivariate Analysis"; OMS Shuppan; Apr. 20, 2001; pp. 7-16.

International Preliminary Examination Report mailed on Jul. 22, 2004 in International Application No. PCT/JP02/12806, filed Dec. 6, 2002.

* cited by examiner

Fig. 3

| CONTENTS | EXPLICATION |
|---|---|
| DATE | |
| ADDRESS OF REQUESTED RESOURCE | |
| ADDRESS OF READER | |
| ID OF READER | IN THE CASE WHERE AUTHENTICATION FUNCTION CORRESPONDING TO ONE OF THE FUNCTIONS OF http SERVER IS USED OR THE CASE WHERE BROWSER OF READER SENDS IDENTIFICATION INFORMATION ALLOWING USER TO BE SPECIFIED BY PRE-ISSUED Cookie, IDENTIFICATION INFORMATION IS RECORDED. |
| query | ACCESSES TO THE SAME ADDRESS MAY SOMETIMES BE CLASSIFIED BY THIS VALUE. |
| STATUS | STATUS DEFINED IN HTTP. THIS IS USED FOR DISTINGUISHING THE ERROR OCCURRENCE.. |
| BROWSER AND OS INFORMATION OF READER | READER INFORMATION REMAINING IN LOG AS user_agent; AND BROWSER AND OS USED BY READER, SUPPOSED THEREBY. |
| ADDRESS OF REFERRER | |
| REFERRER IS IN THE SAME SITE OR NOT | REFERENCE WITHIN THE SAME SITE OR REFERENCE FROM EXTERNAL SITE. |
| SEARCH STRING | IN THE CASE WHERE REFERRER IS SEARCH ENGINE, USED SEARCH STRING IS EXTRACTED BY METHOD PREDESCRIBED IN CONFIGURATION FILE. |
| GROUP TO WHICH REQUESTED PAGE BELONGS | IN THE CASE WHERE PAGE BELONGS TO ANY ONE OF PAGE GROUPS PRESPECIFIED BY CONFIGURATION FILE, ID THEREOF IS RECORDED. |
| STAGE OF FORM TRANSMISSION | IF PAGE IS ONE OF THE STEPS OF A SERIES OF FORM TRANSMISSION, "ENTRY SCREEN," "CONFIRMATION SCREEN," AND "TRANSMISSION COMPLETION SCREEN," ID OF FORM (PRESPECIFIED BY CONFIGURATION FILE) AND STAGE OF TRANSMISSION (ENTRY /CONFIRMATION /TRANSMISSION /COMPLETION) ARE RECORDED. |
| TO BE COUNTED OR NOT | 1 IF PAGE IS TO BE COUNTED AS ACCESS NUMBER. |
| SESSION ID | A SERIES OF ACCESSES FROM THE SAME USER (COMPREHENSIVELY ESTIMATED FROM THE ABOVE-MENTIONED USER ID, ADDRESS, BROWSER INFORMATION, AND THE LIKE) IS COLLECTIVELY REFERRED TO AS ONE SESSION; FIRST READ PAGE AND LAST READ PAGE OF THE SESSION ARE PARTICULARLY RECORDED. |
| FIRST PAGE OF SESSION OR NOT | |
| LAST PAGE OF SESSION OR NOT | |
| (NUMBER OF ITEMS DIFFERS DEPENDING ON ITEMS OF ORIGINAL LOG OR THE CONTENTS OF SERVICE) ||

Fig. 4

| ELEMENT | EXPLANATION |
|---|---|
| DATE | DATE AND PAGE ADDRESS TO BE PRECOUNTED |
| ADDRESS | |
| NUMBER OF STARTS OF SESSION | NUMBER OF TIMES FIRST REFERRED IN SESSION |
| NUMBER OF TERMINATIONS OF SESSION | NUMBER OF TIMES LAST REFERRED IN SESSION |
| SESSION START PERCENTAGE | PERCENTAGES OF THE SAME PERCENTAGE SEEMS TO BE REDUNDANT BECAUSE IT CAN BE IMMEDIATELY CALCULATED BY ADDITION TO THE FOLLOWING NUMBER OF SESSIONS; HOWEVER, ALL MONITORED ITEMS (FOR WHICH Z VALUE SHOULD BE CALCULATED) CAN BE DIRECTLY FETCHED OUT FROM TABLE SO AS TO GENERALIZE PROCESS OF DIAGNOSING MODULE. |
| SESSION TERMINATION PERCENTAGE | |
| NUMBER OF SESSIONS | NUMBER OF SESSIONS; TOTAL NUMBER OF SESSIONS OF NEW VISITORS OF NEW VISITORS, RE-VISITORS, AND FREQUENT VISITORS MENTIONED BELOW. |
| NUMBER OF NEW VISITORS | NUMBER OF READERS WHO ARE NEW VISITORS AT START OF SESSION |
| NUMBER OF RE-VISITORS | NUMBER OF RE-VISITORS (READERS WHO HAVE VISITED IN THE PAST EVEN ONCE) AT THE ABOVE TIME |
| NUMBER OF FREQUENT VISITORS | NUMBER OF FREQUENT VISITORS. "FREQUENT VISITOR" IS DETERMINED COMPREHENSIVELY BASED ON ELAPSED DAYS FROM FIRST VISIT, INTERVAL OF VISITS, TOTAL NUMBER OF VISITS AND THE LIKE. CONCEPTION UNIQUE TO THIS ANALYZING PROGRAM |
| NUMBER OF RELOADS | NUMBER OF PLURALITY OF REFERENCES IN THE SAME SESSION. NUMBER OF RELOADS IS ADDED TO NUMBER OF SESSIONS TO OBTAIN TOTAL ACCESS NUMBER |
| PERCENTAGE OF NEW VISITORS | PERCENTAGE OF THE SAME |
| PERCENTAGE OF RE-VISITORS | |
| PERCENTAGE OF FREQUENT VISITORS | |
| PERCENTAGE OF RELOADS | |
| AVERAGE PROCESSING TIME | AVERAGE TIME REQUIRED FOR PROCESS |
| AVERAGE NUMBER OF TRANSMITTED BYTES | AVERAGE NUMBER OF TRANSMITTED BYTES |

Fig. 5

| ELEMENT | EXPLICATION |
|---|---|
| USER ID | IDENTIFIER UNIQUELY ASSIGNED TO THE SAME READER (READER ASSUMED TO BE THE SAME READER) |
| BROWSER/OS INFORMATION | user agent RECORDED AT LAST VISIT |
| ADDRESS | ADDRESS RECORDED AT LAST VISIT |
| TOTAL NUMBER OF VISITS | TOTAL NUMBER OF SESSIONS BY THAT TIME |
| FIRST VISIT DATE | DATE OF FIRST VISIT |
| REFERRER AT FIRST VISIT | EXTERNAL LINK FOLLOWED AT FIRST VISIT (IF ANY) |
| SEARCH STRING AT FIRST VISIT | SEARCH STRING USED AT FIRST VISIT (IF ANY) |
| LAST VISIT DATE | DATE OF LAST VISIT |
| STATUS | NEW VISITOR/RE-VISITOR/FREQUENT VISITOR; AMONG REVISITORS (READERS WHO MADE A VISIT TWICE OR MORE), THOSE WHO MADE PREDETERMINED NUMBER OF VISITORS OR MORE, AND FOR WHOM PREDETERMINED NUMBER OF DAYS OR MORE ELAPSED FROM FIRST VISIT, AND INTERVAL FROM LAST VISIT DAY IS PREDETERMINED TIME OR LESS, ARE UPGRADED TO "FREQUENT VISITORS." |

Fig. 6

| ELEMENT | EXPLICATION |
|---|---|
| DATE | DATE TO BE DISPLAYED |
| DIAGNOSTIC STATEMENT | DIAGNOSTIC STATEMENT ITSELF |
| LINK | IF LINKED AT DISPLAY, THE LINK |
| VALUE | VALUE OF POPULATION CORRESPONDING TO SUBJECT OF DIAGNOSTIC STATEMENT (FOR EXAMPLE, "ADDRESS XX") |
| Z VALUE | Z VALUE OF ITEM MONITORED (AND DETERMINED AS SPECIFIC) BY DIAGNOSTIC MODULE FOR THE ABOVE VALUE (FOR EXAMPLE, "Z VALUE OF ACCESS NUMBER TO THE ADDRESS") |
| MODULE ID | ID OF MODULE OUTPUTTING THE DIAGNOSIS |
| TYPE OF DIAGNOSTIC STATEMENT | IF ONE MODULE CREATES DIFFERENT TYPES OF DIAGNOSTIC STATEMENT FOR A PLURALITY OF MONITORED ITEMS, INDEX FOR DISTINGUISHING THEM FROM ONE ANOTHER |
| SUB-DIAGNOSTIC STATEMENT OR NOT | 1 IF IT IS SUB-DIAGNOSTIC STATEMENT |

Fig. 8

| ELEMENT | EXPLICATION |
|---|---|
| POPULATION TABLE NAME | SPECIFY POPULATION TO BE DIAGNOSED. FOR EXAMPLE, SPECIFY IN THE FORM "FOR ALL ADDRESSES (URL) APPEARING ON PRECOUNT TABLE OF ACCESS NUMBER FROM DATE X TO DATE X, GIVE THE FOLLOWING DIAGNOSIS." |
| POPULATION ITEM NAME | |
| SEARCH RANGE OF POPULATION | |
| ITEM NAME | CHECK Z VALUE OF THIS ITEM (FOR EXAMPLE, "ACCESS NUMBER") |
| Z VALUE DETERMINED AS "ESPECIALLY LARGE" | THRESHOLD VALUE OF Z VALUE DETERMINED AS "ESPECIALLY LARGE," "SLIGHTLY LARGE," "SLIGHTLY SMALL," AND "ESPECIALLY SMALL" |
| Z VALUE DETERMINED AS "SLIGHTLY LARGE" | |
| Z VALUE DETERMINED AS "SLIGHTLY SMALL" | |
| Z VALUE DETERMINED AS "ESPECIALLY SMALL" | |
| DIAGNOSTIC STATEMENT MODEL IN THE CASE OF "ESPECIALLY LARGE" | MODULE OF DIAGNOSTIC STATEMENT WRITTEN IN EACH CASE. FOR EXAMPLE, LIKE "NUMBER OF ACCESSES TO \$value IS SHARPLY INCREASED," IT IS POSSIBLE TO SPECIFY VARIABLE (PART CORRESPONDING TO "\$value") SO AS TO SUBSTITUTE IT WITH NAME OF SPECIFIED ITEM AND ITS VALUE |
| DIAGNOSTIC STATEMENT MODEL IN THE CASE OF "SLIGHTLY LARGE" | |
| DIAGNOSTIC STATEMENT MODEL IN THE CASE OF "SLIGHTLY SMALL" | |
| DIAGNOSTIC STATEMENT MODEL IN THE CASE OF "ESPECIALLY SMALL" | |
| (NUMBER OF THE ABOVE ITEMS CORRESPONDING TO THAT OF ITEMS TO BE DIAGNOSED ARE PRESENT) | |
| NUMBER OF SAMPLES OF DATA IN THE PAST | SPECIFY SAMPLES OF HOW MANY DAYS ARE TO BE OBTAINED WHEN AVERAGE AND DISPERSION IN THE PAST ARE TO BE CALCULATED. |
| MINIMUM VALUE OF SAMPLE NUMBER | IF SPECIFIED NUMBER OF EFFECTIVE SAMPLES ARE NOT OBTAINED, DETERMINATION IS INTERRUPTED. |
| MINIMUM VALUE OF TOTAL VALUE | EVEN IN THE CASE WHERE NUMBER OF EFFECTIVE SAMPLES IS SUFFICIENT, IF EACH VALUE IS TOO SMALL TO BE DATA SERVING AS PROBABILITY DISTRIBUTION, DETERMINATION IS ALSO INTERRUPTED. |
| TREATMENT OF NULL VALUE | IF TOTAL NUMBER IS NOT PRESENT ON PRECOUNT TABLE, SPECIFY WHETHER THE ABSENCE IS DETERMINED AS INVALID SANPLE OR 0. |
| MODULE NAME | MODULE NAME WRITTEN ON DIAGNOSTIC STATEMENT TABLE; BEING USED LATER BY ANOTHER MODULE TO WRITE DIAGNOSTIC STATEMENTS AND CLASSIFY THEM FOR EACH MODULE. |

Fig. 9

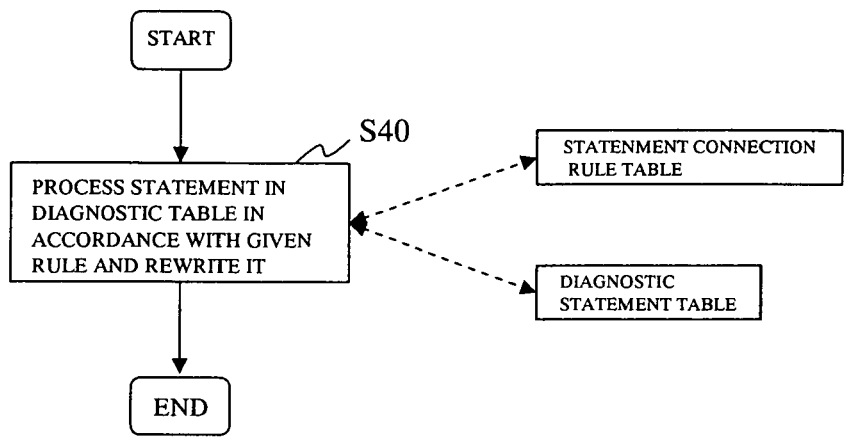

Fig. 10

| ELEMENT | EXPLICATION |
|---|---|
| WRITING MODULE ID | INDEX FOR FETCHING OUT ONLY THE SAME TYPE OF DIAGNOSTIC STATEMENT WRITTEN BY THE SAME MODULE |
| TYPE OF DIAGNOSTIC STATEMENT | |
| CONVERSION RULE IN THE CASE WHERE THE SAME TYPE OF STATEMENT IS TO BE CONNECTED AFTER | DESCRIBE THE PART TO BE CONVERTED AND CONVERSION METHOD IN REGULAR EXPRESSION |
| CONVERSION RULE IN THE CASE WHERE THE SAME TYPE OF STATEMENT IS TO BE CONNECTED BEFORE | DITTO |

Fig. 12

| ELEMENT | EXPLICATION |
|---|---|
| PROCESS ID | ID FOR DISTINGUISHING A PLURALITY OF PROCESSES FROM ONE ANOTHER IN THE CASE WHERE A SERIES OF PROCESSES ARE SIMULTANEOUSLY EXECUTED |
| MODULE ID | ID OF EACH OF THE MODULES CONSTITUTING A SERIES OF PROCESSES |
| EXECUTION STATUS | RECORD THAT THE MODULE:(1) HAS ALREADY BEEN EXECUTED; (2) IS CURRENTLY EXECUTED; OR (3) HAS NOT BEEN EXECUTED YET |
| CONTEXT | ARGUMENT WHEN THE MODULE (EXECUTION PROGRAM) IS CALLED |

Fig. 13

| ELEMENT | EXPLICATION |
|---|---|
| MODULE ID | THE SAME MODULE ID AS THAT IN THE ABOVE TABLE |
| EXECUTION FILE NAME | ACTUAL FILE NAME OF THE MODULE |
| DEPENDENT MODULE LIST | LIST OF MODULES WHOSE EXECUTION HAS TO BE DONE BEFORE CALLING THE MODULE |

ACCESS LOG ANALYZER AND ACCESS LOG ANALYZING METHOD

BACKGROUND OF THE INVENTION

1. Field of the Invention

The present invention relates to an access log analyzer for analyzing an access log of a server, and in particular, to an access log analyzer for, for example, statistically analyzing an access status of a Web server, which is disclosed on the Internet, so as to be used as a marketing tool for determining the needs of users, for component optimization, and the like.

2. Description of the Related Art

A conventional access log analyzer acquires an access log from a Web server so as to analyze the contents of the acquired access log for totaling the number of hits for each Web page or for each referrer. The number of hits is used to determine the usage of a Web site, for comparison between a number of sites, and the like.

For displaying the results of such analysis, a graph or a table is mainly used. An absolute value is generally represented by a bar chart, whereas a rate is generally represented by a pie chart.

However, since such a conventional access log analyzer basically uses a total number of hits as means of analyzing data, important data may be buried in a large amount of data in some cases.

For example, when the number of hits of the current day is to be evaluated, a change in the number of hits in comparison with the previous number of hits is more important than an absolute value of the number of hits itself. However, since a conventional access log analyzer merely displays an absolute value of the number of hits as a daily change, useful information turns out to be buried in some cases.

Moreover, a difference between the N-th rank and the N+1-th rank is not constant in ranking. Therefore, if the first ranking page is a "clear winner" outdistancing the others, a usual page may rank second in some cases. Furthermore, even if there is a page having a considerably increasing number of hits even though the number is small in absolute number, such a page is buried by a page constantly having a large number of hits.

On the other hand, although the use of a graph or a table is effective to allow easy viewing of a large amount of data as a presentation method, the graph or table merely shows the result of the adding up all of the hits in an easy-to-view manner. Therefore, what the graph or table indicates is required to be read by a user.

In particular, if the number of survey items is increased, the number of graphs or tables is correspondingly increased so as to become enormous. Accordingly, it is difficult to find out useful information from an enormous number of graphs or tables. As a result, the result of analysis is not fully utilized in some cases.

More specifically, assuming that a Web site is evaluated at three steps, from "totaling," "analysis" to "examination for a next strategy," only the first step "totaling" is performed in a conventional access log analyzer. An important "analysis" process is required to be manually done based on an enormous amount of data. As a result, there is a problem that a satisfactory result is not obtained in many cases.

SUMMARY OF THE INVENTION

In order to overcome the above-described problems, preferred embodiments of the present invention provides an access log analyzer capable of extracting significant information from an enormous amount of data of access logs of a Web server so as to adequately display the result of analysis.

According to a preferred embodiment of the present invention, an access log analyzer includes access log acquisition means for acquiring an access log from a server to be analyzed, totaling means for totaling the data acquired by the access log acquisition means for each monitored item, diagnosis means for diagnosing an access status of the server based on the data totaled by the totaling means, and diagnosis result providing means for providing the result of diagnosis given by the diagnosis means to a requester of the analysis, wherein the diagnosis means includes statistical variation amount calculation means for calculating an amount of variation in target data based on the statistic of data within a predetermined period of time for the monitored item, and diagnostic statement creating means for creating a diagnostic statement with reference to a diagnostic table describing a model of a diagnostic statement corresponding to a range of the amount of statistical variation calculated by the statistical variation amount calculation means.

Since the amount of variation in the target data is calculated based on the statistic of data within the predetermined period of time for the monitored item by the statistical variation amount calculation means, it is possible to extract a significant variation, which is important for the requester of the analysis, from an enormous amount of data. Moreover, since the diagnostic statements are created by using the diagnostic table in which the ranges of the amount of statistical variation are correlated with the models of the diagnostic statement, it is possible not only to merely display the result of the totaling in the graph but also to display the meaning of the data in a natural language in an easy-to-understand manner.

The statistical variation amount calculation means preferably includes means for obtaining an average and a dispersion within a predetermined period of time and for calculating a Z value (Z score) obtained by normalizing a deviation from an average of the target data with a standard deviation based on the average and the dispersion.

By using the Z value (Z score) as the amount of statistical variation, a standard effective in comparison of a variation for an event, in which a change is not stable, can be obtained. As a result, various data can be objectively analyzed.

The diagnosis means preferably includes second statistical variation amount calculation means for calculating an amount of variation in the target data based on the statistic of data within a predetermined period of time for the data related to the diagnostic statement created by the diagnostic statement creating means, and sub-diagnostic statement creating means for creating a sub-diagnostic statement with reference to a sub-diagnostic table describing a model of a diagnostic statement corresponding to the range of the amount of statistical variation calculated by the second statistical variation amount calculation means.

Since a significant variation in the data related to a diagnostic statement (hereinafter, referred to as a main diagnostic statement) created by the diagnostic statement creating means is extracted by the second statistical variation amount calculation means, whereas a sub-diagnostic statement is created by the sub-diagnostic statement creating means using the sub-diagnostic table in which the ranges of the amount of statistical variation are correlated with the models of the diagnostic statement, it is possible to explain in a complementary manner why a significant variation occurs for a monitored item if it occurs. As a result, a requester of the analysis can more precisely determine the meaning of the variation in the data.

The diagnosis means preferably includes diagnostic statement connection means for connecting a plurality of the created diagnostic statements.

Since the diagnostic statement connection means allows the same kind of diagnostic statement to be deleted or a plurality of diagnostic statements to be combined into one, it is possible to prevent a large number of diagnostic statements from being enumerated, thereby providing an easy-to-read display for a requester of the analysis.

The diagnosis means preferably includes statistical change amount calculation means for calculating statistical change tendency in the data within a predetermined period of time as an amount of statistical change, and second diagnostic statement creating means for creating a diagnostic statement with reference to a second diagnostic table describing a model of a diagnostic statement corresponding to a range of the amount of statistical change calculated by the statistical change amount calculation means.

It is possible to detect not only the amount of statistical variation but also the statistical change tendency in the data by the statistical change amount calculation means. Moreover, it is possible to provide an appropriate diagnostic statement for the detected event by the second diagnostic statement creating means. Thus, the result of diagnosis can be provided for a requester of the analysis from a wider point of view. Moreover, the second statistical change amount calculation means for calculating the amount of statistical change for the data related to the diagnostic statement created for the monitored item may be provided. Second sub-diagnostic statement creating means for creating a sub-diagnostic statement with reference to a second sub-diagnostic table describing a model of a diagnostic statement corresponding to the range of the amount of statistical change calculated by the second statistical change amount calculation means may also be provided. Moreover, means for creating a diagnostic statement by using both the amount of statistical variation and the amount of statistical change may be provided. As a result, a more appropriate result of analysis can be provided for a requester of the analysis.

As the statistical change amount calculation means, for example, data within a predetermined period of time is subjected to linear approximation by a least squares approximation method so that a gradient obtained thereby can be used as the amount of statistical change.

The totaling means preferably includes pre-formatting means for specifying an object to be totaled by using a regular expression.

Since the object to be totaled is predetermined by the pre-formatting means, the diagnosis by the diagnosis means can be more efficiently provided. Moreover, it is also possible to perform customization in accordance with the properties peculiar to a site prior to the diagnosis.

Moreover, since the search function using the regular expression is used to specify the object to be totaled, the process can be efficiently carried out by using a general-purpose function in a text processing language.

The access log analyzer also preferably includes execution management means for monitoring mutual dependency of processes of the access log acquisition means, the totaling means, and the diagnosis means so as to manage the execution.

Since the execution is managed by monitoring the mutual dependency between the respective processing modules with the execution management means, a large number of processing modules can be processed in parallel to efficiently process an enormous amount of data. Moreover, by modifying the description of the dependency relation, a new processing module can be easily added. As a result, it is easy to customize the contents of a service for each requester of the analysis. Furthermore, the access log of a server can be constantly monitored by using the execution management means so as to automatically issue a message to a requester of the analysis when a distinctive event occurs.

The totaling means preferably has a function of classifying visitors into new visitors and repeat visitors based on referrer information and further sorting out frequent visitors from the repeat visitors based on the number of visits and the interval of visits, and the diagnosis result providing means has a function of displaying a rate of the new visitors, the repeat visitors, and the frequent visitors obtained by the classification as visitor information in a graph in different colors.

Since the visitors are classified by the totaling means into new visitors, repeat visitors, and frequent visitors, and the ratio thereof is displayed by the diagnosis result providing means in a graph in different colors, a requester of the analysis can see the tendency of visitors at a glance.

The access log analyzer also preferably includes license management means for acquiring license information of the requester of the analysis so as to determine if a service can be provided or not.

Since the license information of a requester of the analysis is acquired by the license management means so as to determine if a service can be provided or not, an access log analysis service can be provided uniquely for a user with an authorized license.

An access log analyzing method according to another preferred embodiment includes the steps of acquiring an access log from a server to be analyzed, totaling the acquired data for each monitored item, diagnosing an access status of the server based on the totaled data, and providing the result of diagnosis to a requester of the analysis, wherein the diagnosing step includes a step of calculating an amount of variation in target data based on the statistic of data within a predetermined period of time for the monitored item, and a step of creating a diagnostic statement with reference to a diagnostic table defining a model of a diagnostic statement corresponding to a range of the calculated amount of statistical variation.

Since the process includes the step of calculating the amount of variation in the target data based on the statistic of data within a predetermined period of time for the monitored item as the step of diagnosing the access status of the server, it is possible to extract a significant variation, which is important for a requester of the analysis, from an enormous amount of data. Moreover, the process also includes the step of creating a diagnostic statement by using the diagnostic table, in which the ranges of the calculated amount of statistical variation are correlated with the models of the diagnostic statement, it is possible not only to merely display the result of totaling of the data in a graph for a requester of the analysis but also to display the meaning of the data in a natural language in an easy-to-understand manner. As the step of calculating the amount of variation in the target data, for example, a Z value (Z score) or the like can be used. The Z value is obtained by first obtaining an average and a dispersion of data within a predetermined period of time and then normalizing a deviation from the average of the target data with a standard deviation based on the obtained average and the dispersion.

With the access log analyzing method which includes the features and can perform the functions of the various preferred embodiments described above, the same functions and effects as those obtained by the access log analyzer described above can also be obtained.

According to another preferred embodiment of the present invention, an access log analyzing program is a program for making a computer execute at least the procedures of acquiring an access log from a server to be analyzed, totaling the acquired data for each monitored item, diagnosing an access status of the server based on the totaled data, and providing the result of diagnosis to a requester of the analysis, wherein the diagnosing procedure includes a procedure of calculating an amount of variation in target data based on the statistic of data within a predetermined period of time for the monitored item, and a procedure of creating a diagnostic statement with reference to a diagnostic table defining a model of a diagnostic statement corresponding to a range of the calculated amount of statistical variation.

Since the program includes the procedure of calculating the amount of variation in the target data based on the statistic of data within a predetermined period of time for the monitored item as the procedure of diagnosing the access status of the server, it is possible to extract a significant variation, which is important for a requester of the analysis, from an enormous amount of data. Moreover, since the program includes the procedure of creating a diagnostic statement by using a diagnostic table, in which the ranges of the calculated amount of statistical variation are correlated with the models of the diagnostic statement, it is possible not only to display for a requester of the analysis the result of the totaling in a graph but also to display the meaning of the data in a natural language in an easy-to-understand manner. As the procedure of calculating the amount of variation in the target data, for example, a Z value (Z score) or the like can be used. The Z value is obtained by first obtaining an average and a dispersion of data within a predetermined period of time and then normalizing a deviation from the average of the target data with a standard deviation based on the obtained average and the dispersion.

By making a computer execute the access log analyzing program including the respective means provided for the access log analyzer described above, the same functions and effects as those obtained by the access log analyzer described above can also be obtained.

The above-described features, elements, means, steps, characteristics, and advantages of the present invention will be more apparent from the following detailed description of preferred embodiments of the present invention with reference to the accompanying drawings.

BRIEF DESCRIPTION OF THE DRAWINGS

FIG. 3 is a view showing an example of a preformatted log;

FIG. 4 is a view showing an example of a pre-count table related to the number of hits;

FIG. 5 is a view showing an example of a pre-count table of a reader;

FIG. 6 is a view showing an example of a diagnostic statement table;

FIG. 8 is a view showing an example of a diagnostic parameter;

FIG. 9 is a process flowchart of a diagnostic statement connection process;

FIG. 10 is a view showing statement connection rules;

FIG. 12 is a view showing an example of a process status table of the dispatcher;

FIG. 13 is a view showing an example of a module dependency relation table of the dispatcher;

DETAILED DESCRIPTION OF PREFERRED EMBODIMENTS

Figure 1:
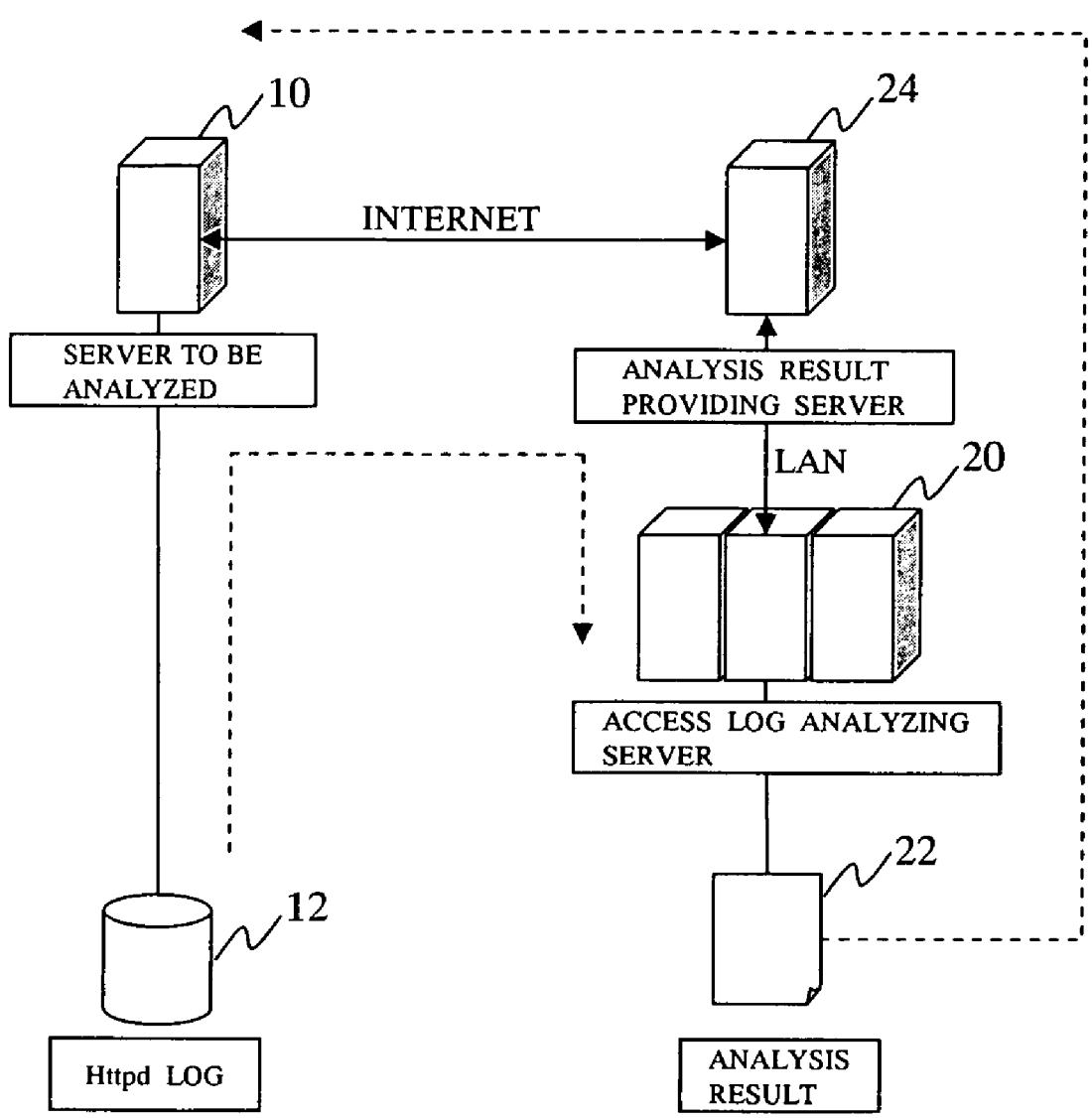
FIG. 1 is a diagram showing a system configuration of an access log analyzer according to a preferred embodiment of the present invention.

FIG. 1 shows a system configuration of an access log analyzer according to a preferred embodiment of the present invention. In FIG. 1, the reference numeral 10 denotes a server to be analyzed, which is generally, an HTTP server on the Internet which is to be analyzed. The reference numeral 12 denotes an access log generated in the server 10 to be analyzed; generally, a so-called httpd log is automatically generated. In the access log analyzer of the present preferred embodiment of the present invention, the httpd log is to be analyzed.

The reference numeral 20 denotes an access log analyzing server for providing an access log analyzing function so as to acquire the log 12 of the server 10 to be analyzed in accordance with a request of a requester of the analysis through the Internet. Then, the access log analyzing server 20 performs the requested analysis on the acquired data and stores the result of the analysis in an analysis result database 22.

The reference numeral 24 denotes an analysis result providing server for displaying the result of analysis on a screen of a computer of the requester of the analysis. The analysis result providing server 24 is an HTTP server that fetches the result of analysis from the analysis result database 22 in accordance with the request of the requester of the analysis so as to convert it into HTML data in a predetermined format. Thereafter, the HTML data is provided for the computer of the requester of the analysis through the Internet. As a result, the requester of the analysis can display the result of the analysis on a screen by using a WWW browser of his/her own computer.

The reason why a dedicated machine is independently provided in the LAN as the access log analyzing server is as follows. An analysis process requires a storage device having high processability and a large capacity. Therefore, by increasing the number of analyzing servers, a service can be provided to a large number of requesters of the analysis by a single HTTP server even if the number of requesters of the analysis is increased. Moreover, the analysis result database is located in the LAN to enhance maintainability.

Figure 2:
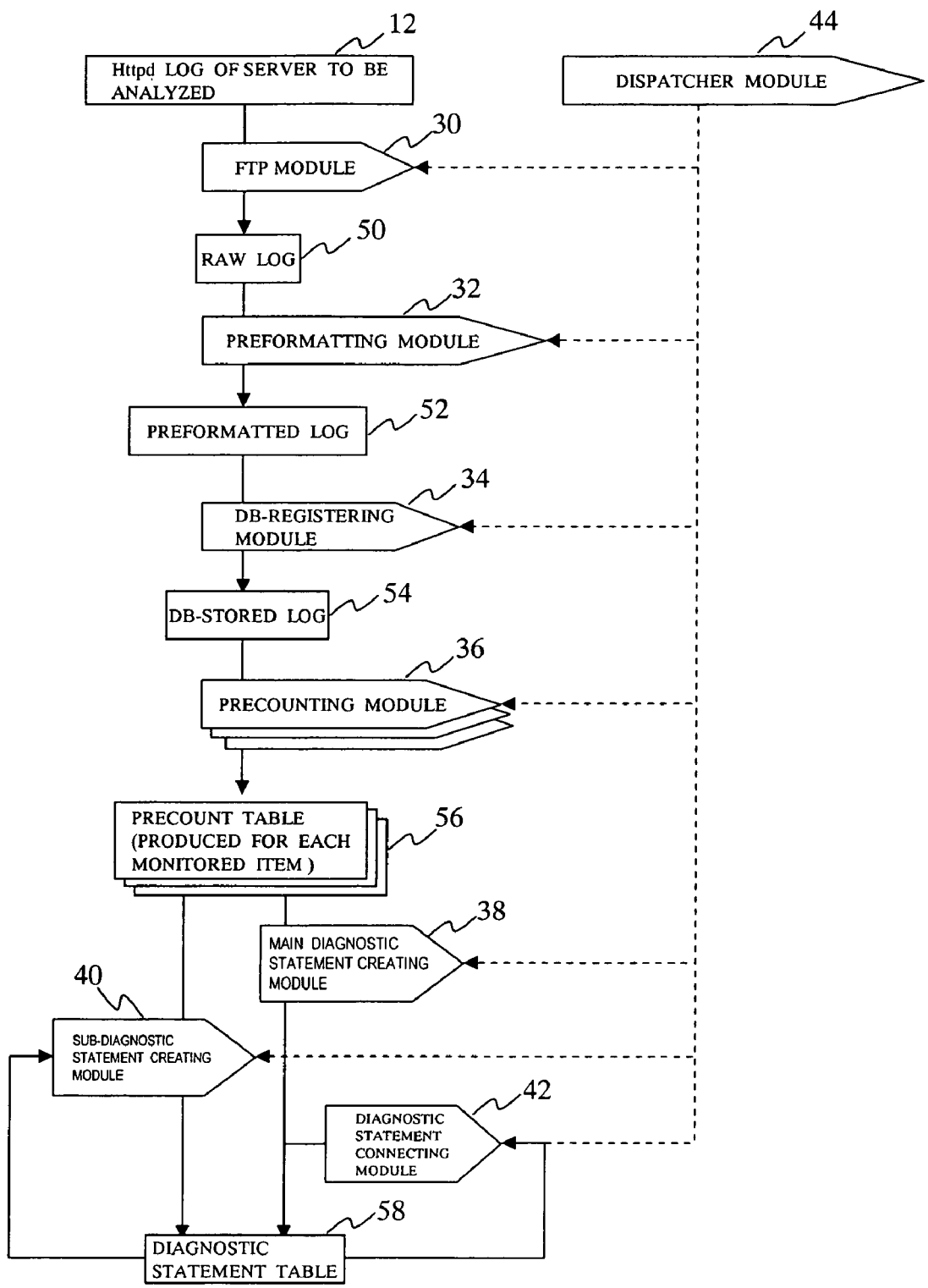
FIG. 2 is an analyzing process flowchart of the access log analyzer according to a preferred embodiment of the present invention.

FIG. 2 shows an analyzing process flow of the access log analyzer according to a preferred embodiment of the present invention. As is illustrated, the access analyzer according to a preferred embodiment of the present invention preferably includes an FTP module 30 for acquiring the httpd log of the server to be analyzed, a pre-formatting module 32 for pre-processing the acquired raw log 50, a DB registering module 34 for registering the pre-formatted log 52 on the analysis result database 22, a pre-counting module 36 for pre-counting a DB-stored log 54 for each monitored item, a main diagnostic statement creating module 38 for analyzing a pre-count table 56 to create a main diagnostic statement, a sub-diagnostic statement creating module 40 for analyzing data related to the main diagnostic statement to create a sub-diagnostic statement, a diagnostic statement connecting module 42 for connecting a plurality of diagnostic statements created on a diagnostic statement table 58, and a dispatcher module 44 for controlling the execution of each of the modules.

The FTP module 30 regularly acquires httpd logs at intervals of 30 minutes to about one day so as to transfer the acquired httpd logs to the access log analyzing server 20. The transferred raw logs 50 are in the form of a text file and slightly differ from each other in the number of items, notation, the order of notation, and the like for each site. In order to convert the raw logs 50 into the common form, the logs are pre-processed by the pre-formatting module 32. The pre-formatting module 32 also has a function of customizing data for the setting peculiar to a site in the following manner. The customization uses a search function in a regular expression.

First, an item to be counted is marked. The log contains transfer information on various resources such as a text, an image, a motion picture, and a CGI call. It is sometimes inappropriate to consider a resource which is a mere component of a page as an access. In such a case, the amount of data can be kept down by excluding such information. Therefore, a configuration file, in which a resource to be counted and an unnecessary resource are predefined in a regular expression, is provided.

For example, "('¥.s?html?$', '¥.php3?$', '¥.cgi$')" is used so as to total data only for the addresses ending in ".html, .shtml, .php3, .cgi."

Second, pages are classified into groups. In the case where it is desired to collectively treat a plurality of files as a group or, on the contrary, it is desired to individually treat the accesses to the same address by a query section, the files or the accesses are specified in a regular expression for the address or the query.

For example, "[id=>'1', path=>'^/admin/', name=>'administration page']" is used to collectively treat the addresses starting with "/admin/" under the name of "administration page."

Moreover, "[path=>'shopping¥.cgi$', query=>'item']" is used to treat the addresses ending in "shopping.cgi" as individual pages based on the part of the query following "item=."

Third, if a referrer is a search engine, a search character is extracted. In the case where a link is followed from the search engine, it is possible to specify the search character from an address and a query remaining in the log as a referrer. If the characteristics of well-known search engines are checked and registered in advance, a search string can be automatically extracted. Also in such a case, a method of distinguishing the search engines from one another or a method of detecting a search string is specified in a regular expression for the referrer address.

For example, with the use of "[name=>'Yahoo!', path=>'yahoo¥.com', query=>'p']," if a reference is made from an address containing "yahoo.com," it means that the access is made from the search site "Yahoo!". Since the part following "p=" in the query corresponds to a search string, the corresponding part is extracted.

Fourth, a transmission stage of a form is marked. In the case where a plurality of pages serve as the respective stages of a series of steps such as "Entry Screen," "Confirmation Screen," and "Transmission Completion Screen" as in the case of a questionnaire, a shopping basket, posting on a bulletin board and the like, the addresses of the respective pages are specified in a regular expression so as to give a diagnosis in the later analysis process, for example, "the number of users who interrupt the transmission on the confirmation screen is increased" or "the visitors who follow a link from the external site XX have a high transmission rate of the form."

For example, "[id=>4, name=>present form',form=>'^/ present/form¥.php3$'.confirm=>',done=>'^/presen t/done¥.php3$']" is used to detect that addresses "/present/ form.php3" and "/present/done.php3" correspond to "Entry Screen" and "Transmission Completion Screen" of the same "present form."

The reason why such a pre-process is done before database registering is that the setting using a large number of regular expressions can be more effectively processed by using a text processing language (for example, Perl) than by using a processing language provided by the database server.

An exemplary structure of the thus pre-processed pre-formatted log is shown in FIG. 3.

A process of the pre-counting module 36 will now be described.

The pre-counting means performs a calculation required for a later process in advance, and thus, totals the data for each monitored item. The monitored items are the number of hits per page, a referrer, a search string in the case where the referrer is a search engine, a visit history of a reader, the entry page and the exit page, a browser used by a reader, an OS, day attributes (a holiday, date of page update, date of the start of a campaign and the like), and the like. A variation in the accesses is detected or the cause of such a variation is specified for the above-mentioned items.

The pre-counting module 36 produces a pre-count table in the same form per monitored item so as to generalize a feature extraction process that follows. In this case, the number of tables and the number of dedicated totaling modules corresponding to the number of items to be totaled are provided so as to shorten totaling time which may be likely to be extremely long. The pre-counting module 36 not only calculates the total number but also, for example, assumes the accesses that seem to be made by the same reader based on information about a referrer (a user ID, an address, browser information, and the like) recorded in a log so as to determine a series of accesses from the same reader as a "session" to gather up data per reader or session. As an exemplary structure of the thus generated pre-count table, a pre-count table related to the number of hits is shown in FIG. 4, whereas a pre-count table of a reader is shown in FIG. 5.

The pre-count table of a visitor has status information for classifying visitors into new visitors, repeat visitors, and frequent visitors. The status information determines whether the visitor is supposed to be the same as any one of the previous visitors based on the above-described referrer information so as to identify the visitor as a new visitor or a repeat visitor. Next, from the repeat visitors, frequent visitors are extracted based on the number of visits and the interval of visits. In this case, if the number of visits is a predetermined number or more, a predetermined number of days or more elapsed from the first visit, and a predetermined number of days or less elapsed from the last visit to the current visit, the visitor is determined as a frequent visitor.

Next, a diagnostic statement creating process corresponding to the last stage of the analyzing process will be described.

Diagnostic statements are classified into two types; a main diagnostic statement created when a significant variation is detected in the monitored items, and a sub-diagnostic statement for complementarily explaining the reason why such a variation is generated for the main diagnostic statement. The main diagnostic statement is created by the main diagnostic statement creating module 38 whereas the sub-diagnostic statement is created by the sub-diagnostic creating module 40. Then, both diagnostic statements are written to the diagnostic statement table 58. The diagnostic statements written to the diagnostic statement table 58 are processed by the diagnostic statement connecting module 42 so that the same kind of diagnostic statement is deleted or a plurality of diagnostic statements are connected with a conjunction for easy reading.

The main diagnostic statement creating module 38, the sub-diagnostic statement creating module 40, and the diagnostic statement connecting module 42 all perform the writing on the common diagnostic statement table 58. When the main diagnostic statement is written to the diagnostic statement table 58 by the main diagnostic statement creating module 38, the sub-diagnostic statement creating module 40 adds a complementary explanation to the main diagnostic statement. Furthermore, the diagnostic statement connecting module 42 reforms the statements for easy reading. Specifically, the diagnostic statement table 58 plays a role of a blackboard in the case of a blackboard model. An exemplary structure of the diagnostic statement table is shown in FIG. 6.

The main diagnostic statement and the sub-diagnostic statement are created based on the same principle. However, the main diagnostic statement is created for all the data, whereas the sub-diagnostic statement is created only for the data related to the specified main diagnostic statement. For example, only for the access data to a page XX that is especially frequently accessed on the current day, referrers on that day, used browsers, visitors' histories, and the like, which especially distinctively deviate from the usual, are extracted. Therefore, a sub-diagnostic statement creating object is defined as a subclass of a diagnostic object, and is realized by overriding the first population extraction method.

As described above, since the data are converted into a common format at pre-counting, the object itself does not need to know the meaning of the data that the object is processing. By changing a parameter at a call for each monitored item or by defining a subclass so as to override a part of the methods, a page or a site having an especially large number of hits per day can be extracted or a referrer which is especially frequently found can be specified.

Figure 7:
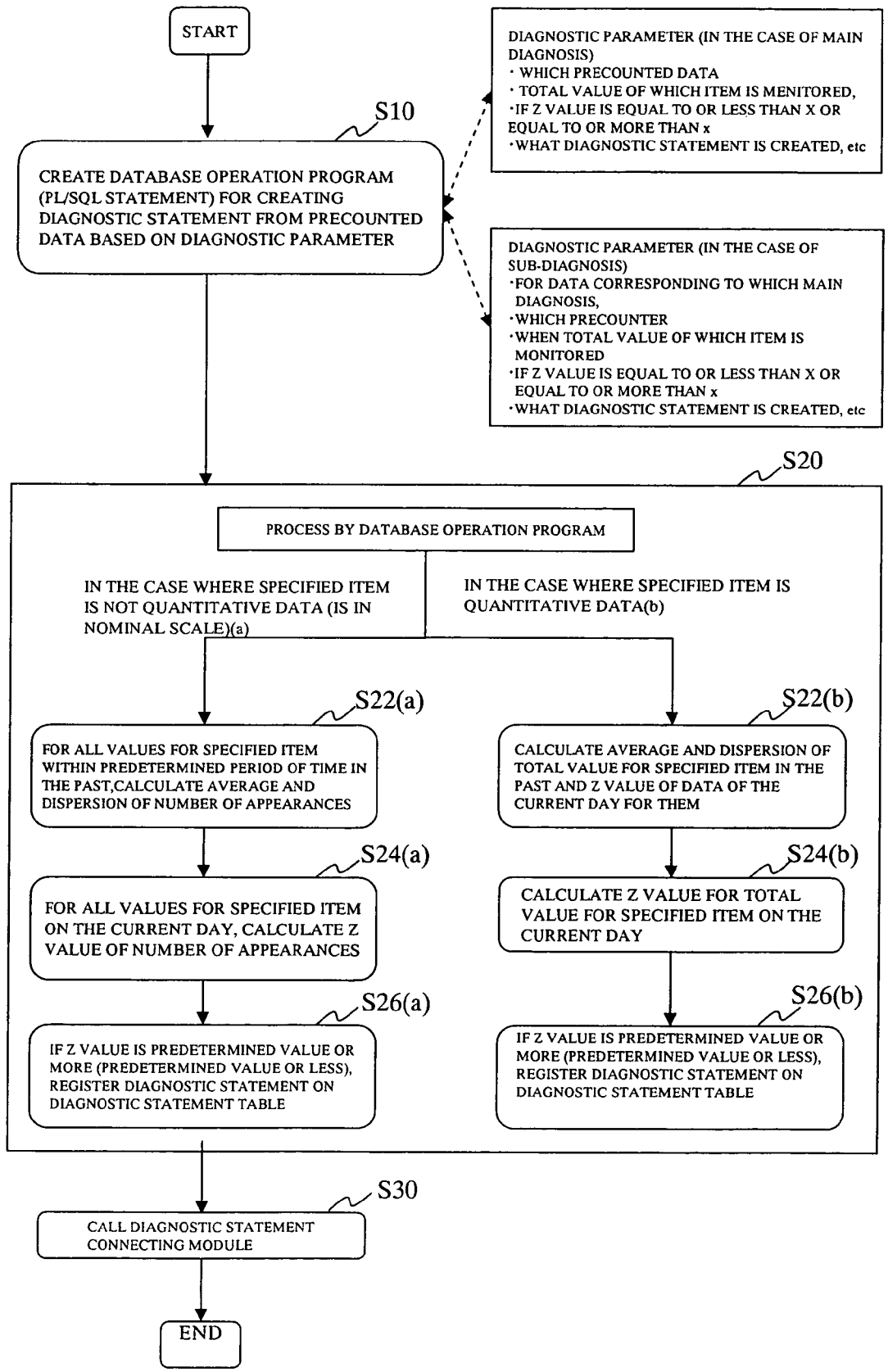
FIG. 7 is a view showing an example of a diagnostic statement creating process.

FIG. 7 shows a process flow of the diagnostic statement creating process. As illustrated, a database operation program for creating a diagnostic statement from the pre-counted data based on a diagnostic parameter (S10). Then, after a diagnostic statement is created by the created database operation program (S20), the diagnostic statement connecting module is called (S30). For the diagnostic parameter, a population, an item name, a threshold value of a Z value, a model of a corresponding diagnostic statement, and the like are described as shown in FIG. 8. The creation of a main diagnostic statement and the creation of a sub-diagnostic statement are switched based on target data.

In the creation of a diagnostic statement (S20), an average and a dispersion within a predetermined period of time in the past are obtained for a specified item (S22). From the obtained average and dispersion, a Z value of the current day is obtained (S24). If the Z value is equal to or larger than a predetermined value, or equal to or less than a predetermined value, a diagnostic statement is created from a model of a corresponding diagnostic statement so as to be registered on the diagnostic statement table (S26). Herein, if the specified item is not quantitative data, the process is performed for the number of appearances of the value of the specified item (a). If the specified item is quantitative data, the process is performed on the total number itself of the specified item (b). The statistical processes are roughly classified into two types depending on whether the processed data is numerical data such as the number of hits or is according to a nominal scale such as the "type of browser." However, the principle of the statistical processes includes the determination based on the Z value "whether a numerical value of the current day particularly deviates from the average and the dispersion in the past or not."

If the Z value exceeds a given threshold value as the result of calculation, a diagnostic statement is created according to the model of a corresponding diagnostic statement so as to be registered on the diagnostic statement table. In other words, if the Z value is within the range of a given threshold value, no diagnostic statement is created, effectively excluding useless information.

A plurality of thresholds can be set on the positive side and the negative side, respectively. As a result, nuances can be given so as to distinguish the types of increase. For example, a threshold set at +1.0 means "slightly large" and a threshold set at +5.0 means "extremely large." The reason why the threshold values can be independently set on the positive side and the negative side is that even data showing a distribution other than a normal distribution can be appropriately diagnosed. In fact, the number of daily accesses to a Web page sometimes demonstrates a characteristic close to a Poisson distribution rather than to a normal distribution. Even in such a case, by differently setting the threshold values on the positive side and the negative side, significant information can be extracted by using the Z value. In this manner, the threshold values on the positive side and the threshold values on the negative side are finely adjusted in accordance with a sample, and a more natural diagnostic statement can be created so that only a status which seems to be "particular" to the human can be reported in a sufficient and necessary manner.

For the day with no totaled data, it is necessary to deliberately determine whether to interpret it as 0 or as an invalid sample in accordance with data properties. For example, if "the total number of accesses to a certain page" is not present on the pre-count table, it may be determined that the data has not been totaled because the access number of that day is 0. However, if it is a "rate of new visitors of a page" that is not present on the pre-count table, it is not appropriate to interpret that the absence of totaling means 0%. If the number of samples or the number of accesses is not sufficiently large, a dispersion has an inappropriate value. Therefore, a restriction is imposed on the process that, in the case where the number of accesses and the number of samples are both equal to or less than predetermined values and therefore it is supposed that the statistical process is not sufficiently significant, no diagnosis is given.

One of the unique advantages achieved by this preferred embodiment is in the form of a "program for generating a program." This is because it is difficult to describe a program with a high general purpose property in a database processing language as described above. Therefore, in this preferred embodiment, the Perl language capable of describing a program with a high general purpose property is used so as to indirectly describe an execution program, thereby improving both the generality and the processing efficiency of the statistical process.

FIG. 9 shows a process flow of a diagnostic statement connecting process. As illustrated, statements in the diagnostic statement table are processed in accordance with a statement connection rule table so as to be rewritten to the diagnostic statement table.

Since the process of the diagnostic statement creating module is generalized, there sometimes remains room for further refining in accordance with the meaning of an individual diagnosis.

For example, for the following five diagnostic statements:

the number of accesses to Δ/050000table/winter/article/list03.htm is slightly increased;

the number of accesses to Δ/050000table/winter/article/select03.htm is slightly increased;

the number of accesses to ▲/050000table/winter/article/today03.htm is sharply increased;

the number of accesses to Δ/050000table/winter/article/winter03.htm is slightly increased; and the number of accesses to Δ/050000table/winter/article/readme03.htm is slightly increased, it may be more natural to consider that the total number of accesses to a directory to which the above-mentioned documents commonly belong rather than to consider that the numbers of accesses to five individual pages are respectively increased. Therefore, a rule for finding out a common directory by following the directories (given by a method) and a connection rule if the diagnosis statement is present (given in a regular expression) are specified so as to connect only the main diagnostic statement related to the number of accesses per page.

In this manner, the above-described five diagnostic statements are connected as follows; "the number of accesses to the pages with /050000table/winter/including ▲/050000table/winter/article/today03.htm is sharply increased".

Similarly, if it is determined that a plurality of pages respectively having an increased number of accesses belong to the same group, diagnostic statements for these pages can be combined into a single statement.

It is desirable that the "method of finding out a common directory" perform tuning in accordance with the characteristics of a site. For example, for a site provided with a rough directory at only two or three stages, the connection of directories are restricted as compared with the case where a directory is detailed in accordance with a logical structure of the statement. As a result, excessive generalization to determine "the number of accesses to the site as a whole is increased" can be prevented. In a large number of sites, by placing a restriction that "the uppermost directory (just under a document root) is not connected," satisfactory results can be obtained.

Moreover, as in the case of a diagnostic statement related to a transmission rate of a form, it is sufficient in some cases to merely add a conjunction to diagnostic statements of the same type of diagnosis to create a complex sentence. Also in this case, a connection rule for connecting corresponding statements is specified so that only the main diagnostic statements related to a transmission rate of a form are connected.

An example of the statement connection rule table is shown in FIG. 10. A conversion rule is given in a regular expression. For example, a conversion rule in the case where there is a statement that follows is determined to convert "'did$/'" into "'did, and'" and a conversion rule in the case where the same type of statement precedes is determined as converting "'^.*(?=exit from the entry page|exit from the confirmation page|execute transmission)'" into "''" (delete a corresponding part). As a result, the following two texts: "The rate of users exiting from the entry page of a present form is decreased" and "The rate of users having transmitted the present form is increased" are connected as: "The rate of users exiting from the entry page of a present form is decreased, and the rate of users having transmitted the present form is increased."

A process of the dispatcher module 44 will now be described.

The above-described modules are discrete and individual programs. Since the modules depend on each other in a complex manner, it is necessary to precisely grasp the dependency relationship so as to manage the execution. The dispatcher module 44 performs such execution management, and manages the execution of the respective processing modules in a suitable order. Moreover, if there are any processing modules which can be processed in parallel, the dispatcher module 44 manages the processing modules to perform parallel processing.

Figure 11:
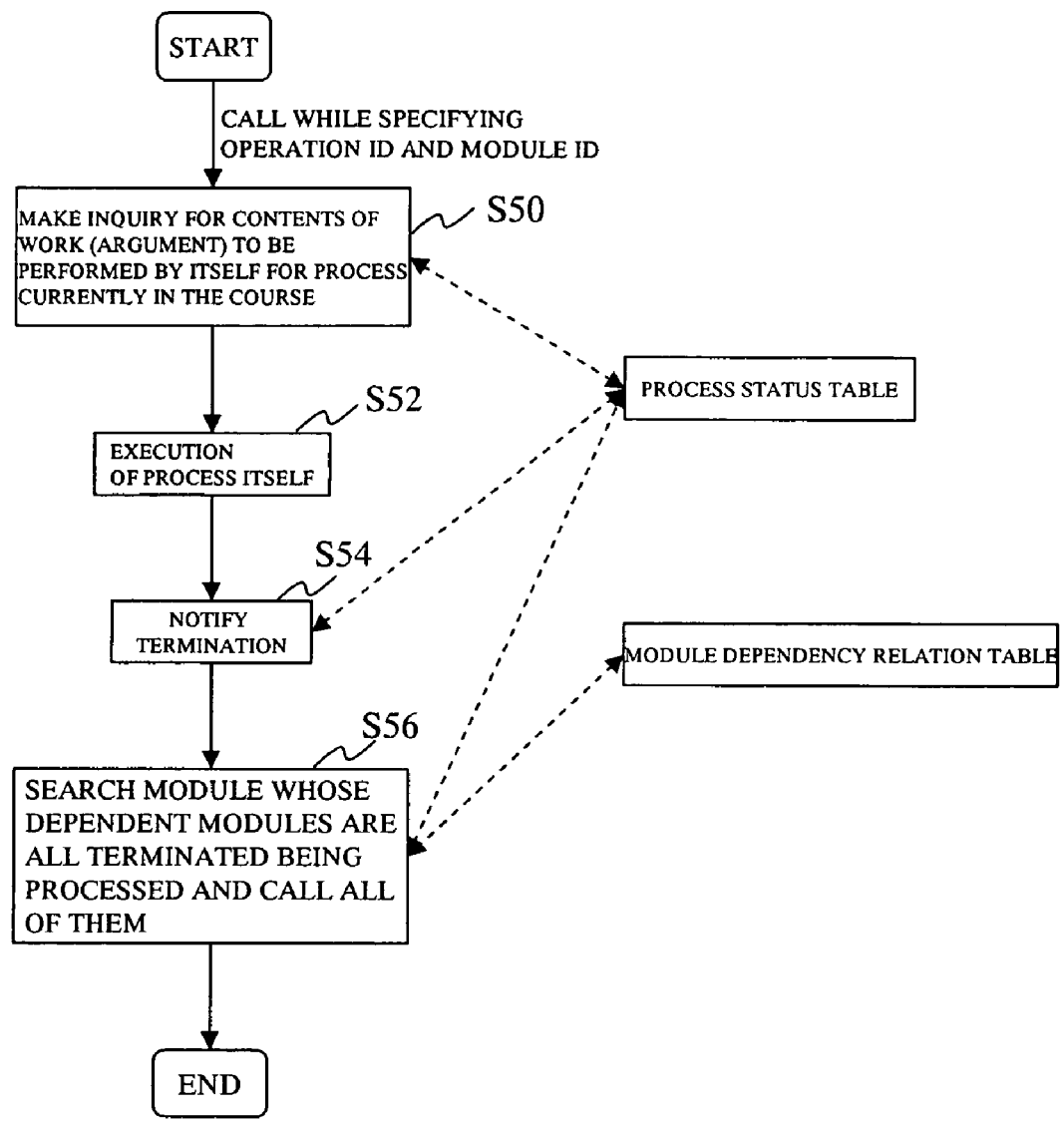
FIG. 11 is a process flowchart of a dispatcher.

FIG. 11 shows a process flow of the dispatcher module 44. As illustrated, the dispatcher module, which is called while specifying an operation ID and a module ID, refers a process status table describing a processing status in the course (S50), calls and executes a process itself (S52), notifies the termination when the process is terminated (S54), searches and calls a module whose dependent modules are all terminated with reference to a module dependency relation table (S56).

The dispatcher is not a program executable by itself, but an object using all the other modules. Each of all the modules involved in the process has an instance of the dispatcher. At the start and the end of execution, the process is passed to the dispatcher. At this time, the dispatcher notifies the current execution status through common data to the other modules or determines a module to be next called.

An exemplary structure of the process status table is shown in FIG. 12, and an exemplary structure of a module dependency relation table is shown in FIG. 13. By modifying the description of the dependency relation of the modules described above, a module can be added or removed from the process later. As a result, the contents of a service can be customized for each requester of the analysis, or a newly produced analyzing module can be easily added.

The result of analysis can be provided from the analysis result providing server 24 as described above. In addition to the contents of the diagnostic statement table, a numerical value or a graph directly fetched from the pre-count table or the like is provided in the HTML format.

Figure 14:
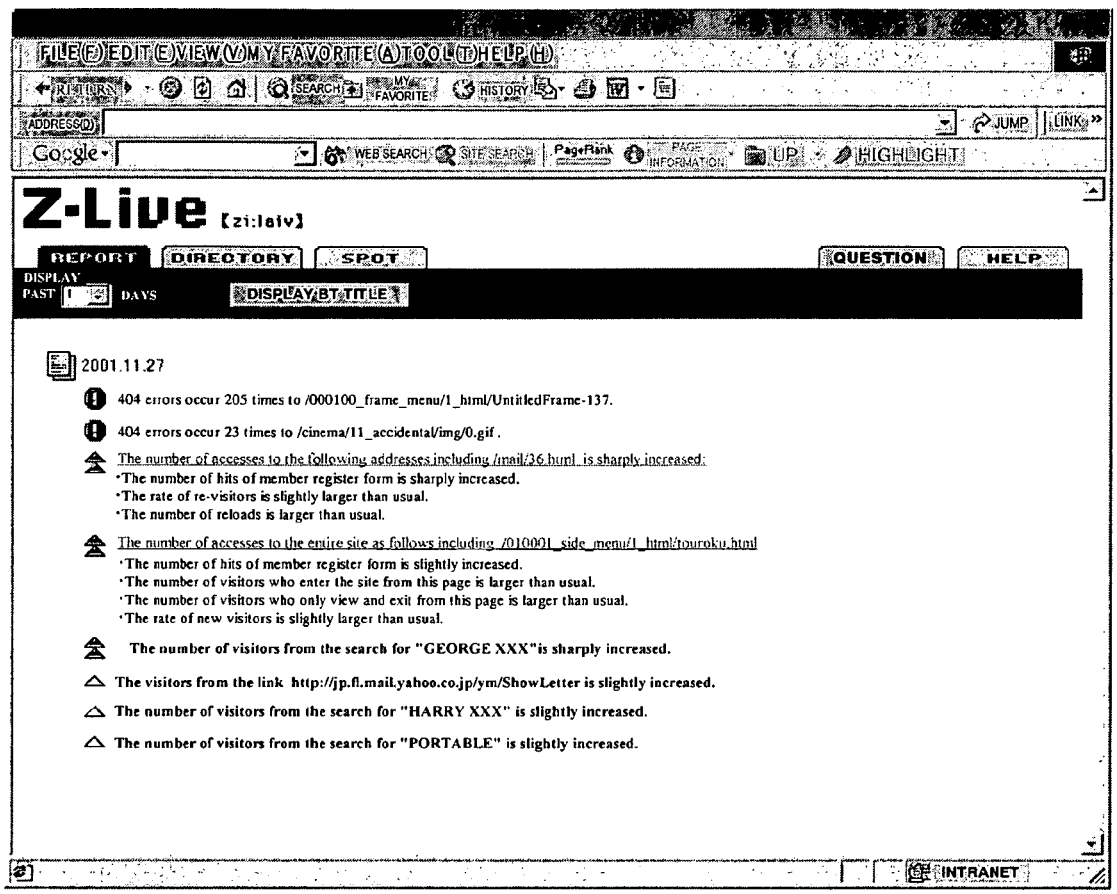
FIG. 14 is a view showing an example of a display screen of the result of diagnosis.
Figure 15:
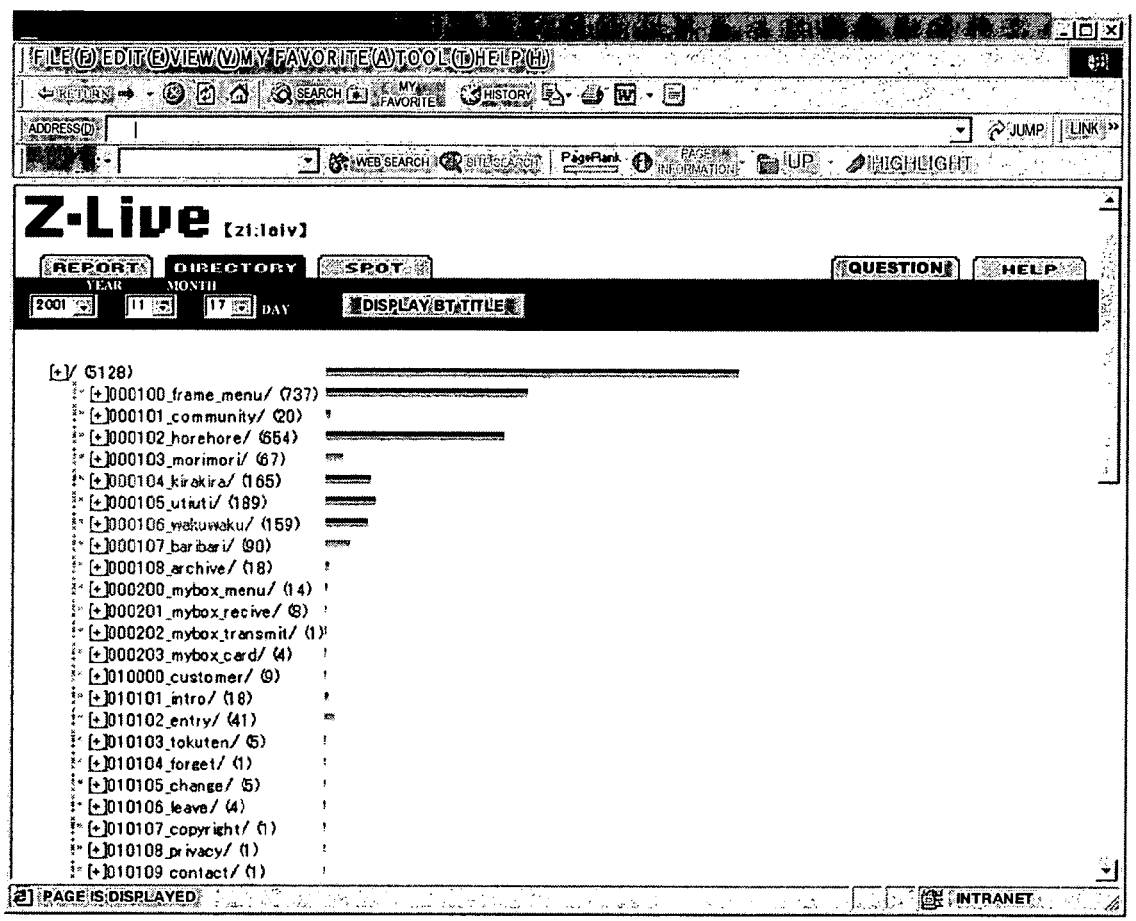
FIG. 15 is a view showing an example of a display screen of graph display.
Figure 16:
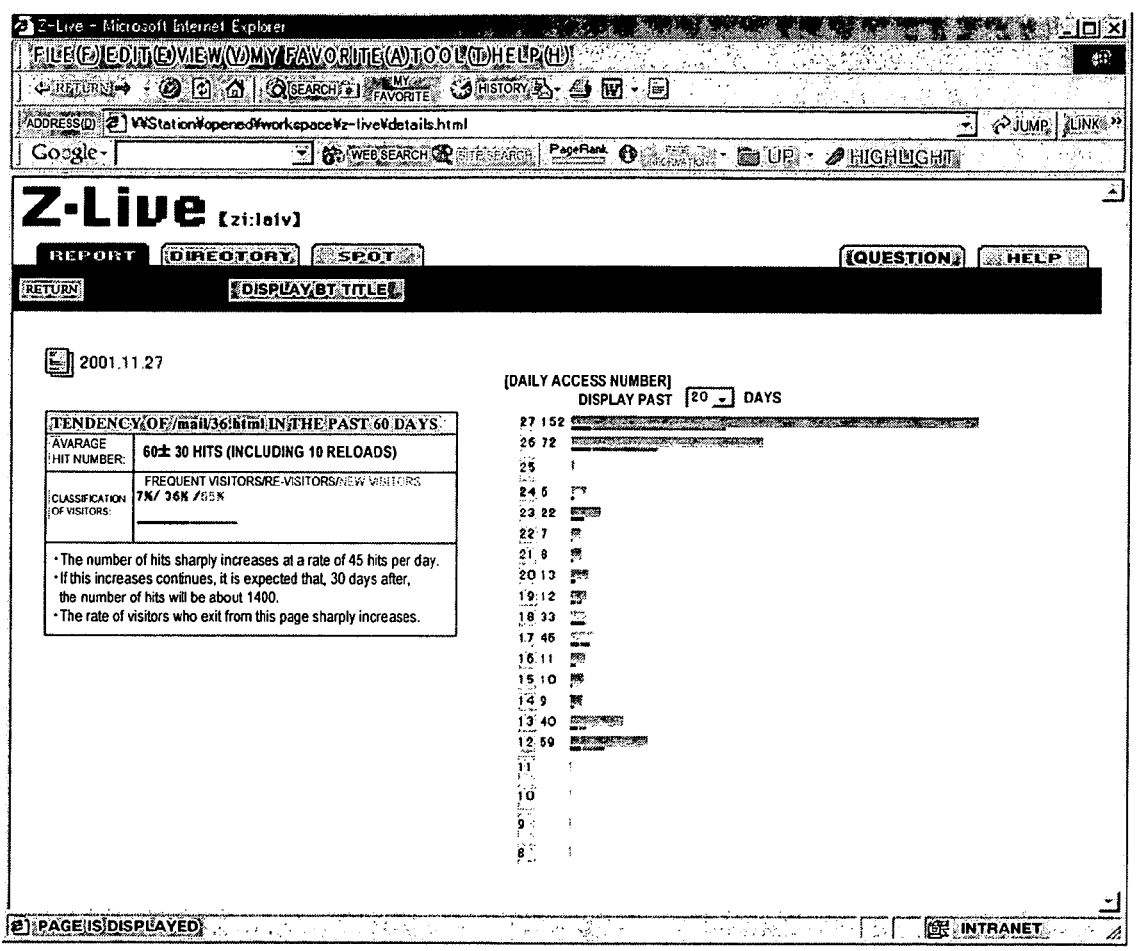
FIG. 16 is a view showing an example of a display screen of a detailed report.

FIGS. 14 to 16 show exemplary screens displaying the results of analysis. As shown in FIG. 14, important characteristics are extracted from a daily access and displayed in Japanese so as to be easy to read. As shown in FIG. 15, the number of accesses to a page indicated by diagnostic statements is displayed in a graph. Moreover, a detailed report as shown in FIG. 16 is also provided.

The diagnostic statements include those related to the occurrence of errors. The reasons for the occurrence of errors are, for example, as follows.

(1) A site has a problem (unsuccessful upload of a page or an image file, a dead link, a trouble in the CGI program, and the like);

(2) An external site has a problem (information of a linked site does not exist or the like);

(3) There is a problem in the environment of a reader (a browser of a reader uses an incompatible function and the like); and (4) An unauthorized access (unauthorized data is sent so as to improperly execute the CGI program, and the like).

Any of the information is important for a site administrator. However, a rate of the occurrence of errors is normally considerably lower than the total access number. Moreover, there are also factors such as resources named favricon.ico and robots.txt (these resources are required by a specific client software although they do not actually exist; there arises no problem even if they are not present. However, the absence of the requested resource is recorded in a log as an error), which constantly cause a large amount of errors. There is a possibility that such a small amount of very important information is buried according to the conventional analyzing method based on the number of accesses. Even in such a case, the detection based on the Z value is effective. For example, an attack by a worm virus or a brute force attack (a method of trying every possible password and the like until the right one is found) frequently found in unauthorized accesses has a characteristic that the same type of error is repeatedly generated within a short period of time. By performing the access log analysis according to various preferred embodiments of the present invention, such problems can be effectively resolved.

Moreover, on the display screen, the composition of visitors is displayed in bar graph as shown in FIG. 16. As described above, the present preferred embodiment of the present invention provides the function of classifying the visitors into new visitors, repeat visitors, and frequent visitors at the pre-count stage. The respective rates thereof are displayed in bar graph in different colors as illustrated. As a result, general tendencies can be easily seen at a glance based on a color dominating the graphs, for example, blackish or whitish. It is difficult to precisely determine whether the reader has visited the page in the past or not. There are a large number of causes for hindering the specification of the identical user; for example, a shared proxy server, a shared personal computer, a provider with an IP address changing for each connection, the possession of a plurality of terminals such as at home, at office, and in a portable telephone, and the like. On the other hand, various methods for storing data or a program for identification in a machine on the reader side have been devised. However, even such methods cannot cope with the case where a user possesses a plurality of terminals or, on the contrary, a single terminal is shared by a plurality of users. Moreover, on the Web site which is principally anonymously accessed, the reader's intention to be anonymous should be respected. In addition, the concept of "frequent visitor" defined in the analyzing program of the present invention is highly arbitrary, and therefore, the result of determination changes depending on the setting. As described above, it is insignificant to discuss the classification of visitors based on quantitative numerical values. Moreover, since strict accuracy is not needed in this type of statistics in many cases, it is considered that the classification of visitors is suitably displayed with a gradation of the graphs.

In the above description, the analyzing process for detecting the "amount of statistical variation" for the monitored item so as to detect a variation from the usual value, and then for putting the result of diagnosis into a statement so as to provide it, has been explained. The access log analyzer of the present preferred embodiment of the present invention also has a function of detecting "statistical change tendency" and of putting the result of the diagnosis into a statement so as to provide it.

The statistical change tendency is realized by the following manner. Data within a predetermined period of time from the pre-counted data or the raw log is subjected to linear approximation by a least squares approximation method. If a gradient of the approximated line is equal to or larger than a predetermined value, a diagnosis statement is created by using a corresponding diagnosis statement model in the same manner as described above.

Alternatively, after an average value or a dispersion value for the monitored item may be obtained, an absolute value of the obtained value is directly compared with a predetermined threshold value so as to create a diagnostic statement by using a corresponding diagnostic statement model.

By combining the thus obtained diagnostic statements, the following diagnostic statements are created:

"▲ The number of hits is sharply increased at a rate of 33 hits per day. If this increase continues, it is expected that, 21 days after, the number of hits will be about 785";

"Most (75%) of the visitors of this page first accessed this page"; and

"The rate of the visitors exiting from this page tends to increase."

Although the Z value of target data is obtained so as to detect the presence of a significant change to a normal variation has been described in the above-described preferred embodiment as a means of calculating the amount of statistic variation, the present invention is not limited thereto. Any means can be used as long as it calculates the amount of variation in target data based on the statistic of data within a predetermined period of time. For example, the effect of the present invention can be obtained by predicting the range of a variation in data of the current day based on the past data history so as to determine the relationship between the predicted range of the variation and the actual data.

Although the case where the diagnostic statements are presented in Japanese has been described in the above-described preferred embodiment, the present invention is not limited thereof. The effect of the present invention can be obtained by using any methods as long as the methods use a natural language to provide the result of analysis.

Although the automatically generated httpd log is used without especially installing a program on the side of the server to be analyzed in the above-described preferred embodiment, a program for generating or processing a log may be installed and executed on the side of the server to be analyzed if the server to be analyzed does not have any functions of generating necessary information. Moreover, a program for performing a compression process to increase a transfer efficiency can be installed if required.

Although the access log is obtained by the FTP module in the above-described preferred embodiment, the present invention is not limited thereto. Any communication means can be used. For example, if the server to be analyzed is compatible with a SOAP as described below, the communication may be carried out by using the SOAP functionality.

Although a Web page described in the HTML format is analyzed in the server to be analyzed in the above-described preferred embodiment, the present invention is not limited thereto. For example, the access log analyzer according to the present invention may be provided with a function compatible with a Web page described in an XML (eXtensible Markup Language).

The XML is characterized by being capable of describing a data structure or data meaning by a tag that can be freely defined by a user and of separately managing the contents and the representation of data from each other by an XSL (eXtensible Stylesheet Language) style sheet. More specifically, since the XML can contain data as well as a tag indicating a name or an attribute of the data, not only simple numerical type or character type data but also arbitrary data, for example, repetitive data such as an array, data having a complicated structure or binary data, can be stored. For example, since data can be represented as "the "price" is "floating point" data and its value is "123.45"," a process for fetching price data out therefrom can be easily executed. As described above, by providing the function of handling XML data for the access log analyzer according to various preferred embodiments of the present invention, the access status of the site can be analyzed while interpreting the meaning of data. Moreover, the obtained meaning information may be used to provide an information associating function or a service associating function between applications. As a result, for example, an effective marketing service can be provided for a site providing a one-stop service.

Although the result of analysis is provided by the Web page described in the HTML format even in the analysis result providing server in the above-described preferred embodiment, the result of analysis may also be provided by a Web page described in the XML. By using the XML, data or the result of analysis can be unified in knowledge representation. Therefore, for example, it is possible to provide a function of reusing the result of analysis such as reading the tendency of the whole Web independently of the site from the result of analysis for a plurality of clients. As described above, by promoting data sharing by the use of XML, versatile simulation can be achieved so as to establish standardized specifications for marketing. Moreover, by unifying internal representation, various analysis process routines in a plug-in form can be added or removed. It is possible to generalize a process, for example, the dispatcher module described above so as to achieve more effective processing. Furthermore, since data other than the access logs can be handled in the same manner as the access logs, the access log analyzer according to various preferred embodiments of the present invention can be used for various purposes as a general-purpose analyzing tool/marketing tool for providing the result of analysis in a flexible and easy-to-read text representation.

Moreover, by producing an ontology (systematic description) for representing raw data, the result of interim totaling, the result of diagnosis, and the like so as to be stored in the XML format or by burying an XML tag in the screen for displaying the result of diagnosis, a so-called Semantic Web excellent in search performance can be constructed to direct a "pattern," a "set sequence," or the like of every service providing site so as to provide secondarily available information for consulting.

Although the server to be analyzed is the HTTP server in the above-described preferred embodiment, the server to be analyzed may also be a server compatible with a SOAP (Simple Object Access Protocol). The SOAP is a communication protocol using an HTTP or the like as a low-level protocol so as to exchange a simple message on the basis of XML for an access to an object (data) on a remote machine. The HTTP protocol is one of those protocols that are most widely diffused in the Internet/Intranet. Even in the case where a company or the like installs a firewall for security, there is a strong possibility that the HTTP protocol can be constantly available without taking special steps such as changing the setting of a filter so as to pass a specific protocol therethrough. The SOAP uses the protocols including the HTTP, such as an SMTP (Simple Mail Transfer Protocol) or the FTP, which have already been widely diffused on the Internet, as a low-level protocol so as to make an access to an object on a remote machine or to call a service routine. Moreover, by using the XML as a representation form of an access request or data returned as the result of such a request, a flexible data access function with high general-purpose properties, which is not limited to a specific format, is provided.

For example, in the case where the httpd of the server to be analyzed is compatible with the SOAP and provides a function of returning a log in response to a request "send a log from X o'clock to X o'clock on X (date)," it is not necessary at all to install a retrieval program on the server to be analyzed. By providing a function of sending an XML message compatible with the SOAP for the access log analyzing server, access logs of the server to be analyzed can be obtained. Moreover, since the access log is obtained as XML data, a process of correcting a different log form for each object to be analyzed, a process such as modification of an IP address to a domain name or the like can be easily carried out. In this manner, the process of the preformatting module or the process of the pre-counting module can be partially or entirely carried out at the acquisition of an access log by using the functions of the SOAP, thereby more effectively analyzing the access logs.

Furthermore, when the server to be analyzed is accessed, the server may notify the access log analyzing server of access information by using the functions of the SOAP so as to perform an analysis process on demand. As described above, the access information is processed at the occurrence of an access, useful information can be efficiently processed without analyzing an enormous amount of stored access logs.

The access log analyzing server and the analysis result providing server are installed on the side of a provider of the access log analyzing service, and are connected to the server to be analyzed, which is installed on the client's site through the Internet to provide an access log analysis service in the above-described preferred embodiment. However, if the provider of the access log analysis service also serves as an ASP (Application Service Provider), the access log analyzing server and the analysis result providing server as well as the server to be analyzed may be provided on the service provider side so as to be mutually connected to each other through a LAN, thereby providing an ASP service and the access log analysis service in combination.

Furthermore, the access log analyzing server or the analysis result providing server may be provided on the client's site to be connected with the server to be analyzed through a LAN so as to provide the access log analysis service. In this case, it is preferred to provide a license management server for managing whether the client is a user with an authorized license or not on the service provider side.

Figure 17:
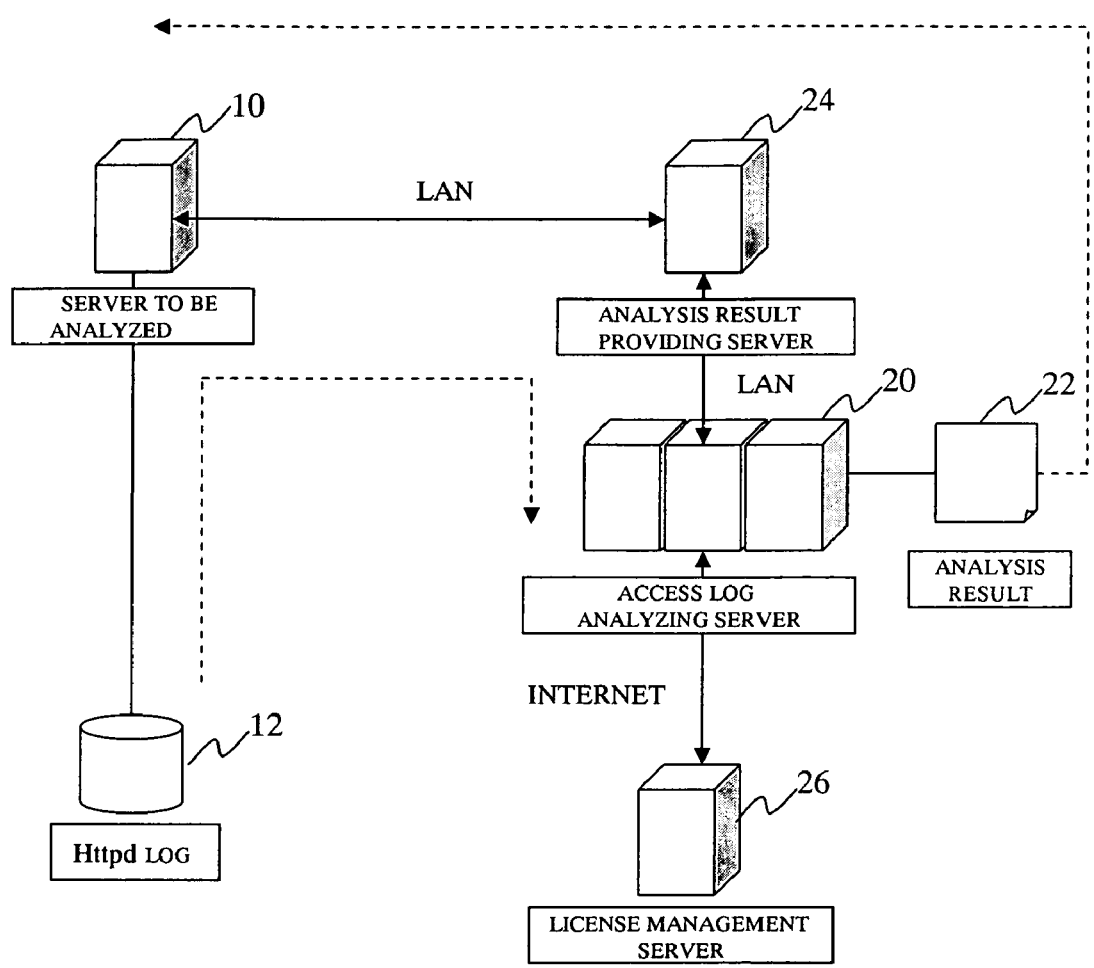
FIG. 17 is a diagram showing a system configuration of an access log analyzer according to another preferred embodiment (license agreement embodiment) of the present invention.

FIG. 17 shows an exemplary configuration of a system in which the access log analysis service is provided to a client based on the license agreement as another preferred embodiment of the present invention. As illustrated, the access log analyzing server 20 and the analysis result providing server 24 are connected to the client's server 10 to be analyzed through the LAN. The access log analyzing server 20 acquires and analyzes the access log 12 from the server 10 to be analyzed in the site so as to provide the result of analysis 22 to the client by the analysis result providing server 24. The service provider includes a license management server 26 for exchanging license information with the access log analyzing server 20 through the Internet to confirm whether the user possesses an authorized license or not.

Although the communication between the license management server 26 and the access log analyzing server 20 may be performed by providing a dedicated communication module, the communication can be easily realized by using the functions of the SOAP described above. More specifically, the access log analyzing server 20 and the license management server 26 are configured to be compatible with the SOAP. The license management server 26 sends license confirmation or an update request for license information to the access log analyzing server 20 by the communication function of the SOAP. In response thereto, the license management server 26 regularly acquires license information. The acquired license information is compared with the registered license information of the client. If the user possesses an authorized license, information allowing the access log analyzing service to be provided is transmitted. As a result, the access log analyzing service can be provided uniquely for a user possessing an authorized license.

Although the server to be analyzed, the analysis result providing server, and the access log analyzing server are provided on the same client site and are mutually connected through the LAN in this preferred embodiment described above, some or all of the servers may be provided on different sites so as to be mutually connected through the Internet.

Furthermore, the access log analyzing service may be provided at a usage based rate for charging a user in accordance with the length of time and the number of times that the service is utilized. In such a case, after the license management server acquires information related to processing time or the number of processes from the access log analyzing server, a fee for the service may be calculated in accordance with a predefined rule based on the acquired information so as to charge the user.

Although the system is configured such that the access log analyzing server and the analysis result providing server are individually provided so as to be mutually connected through the LAN or the Internet in the above-described preferred embodiment, the present invention is not limited thereto. An access log analyzing program having both the function of the access log analyzing server and the function of the analysis result providing server may be installed on a single computer so as to provide the service. Moreover, the access log analyzing program may be installed on the computer shared by the server to be analyzed so as to provide the service. In such a case, since an HTTP server can have both the function of the analysis result providing server and the function of the server to be analyzed, Web pages corresponding to the respective server functions may be individually provided so as to provide the service.

As described above, according to preferred embodiments of the present invention, an access log analyzer includes access log acquisition means for acquiring an access log from a server to be analyzed, totaling means for totaling data acquired by the access log acquisition means for each monitored item, diagnosis means for diagnosing an access status of the server based on the data totaled by the totaling means, and diagnosis result presenting means for displaying the result of diagnosis by the diagnosis means, wherein the diagnosis means includes statistical variation amount calculation means for calculating an amount of variation in target data based on the statistic of data within a predetermined period of time for the monitored item, and diagnosis statement creating means for creating a diagnosis statement with reference to a diagnosis table describing a model of a diagnostic statement corresponding to a range of the calculated amount of statistical variation. Accordingly, preferred embodiments of the present invention are effective in that the access log analyzer is capable of extracting significant information from an enormous amount of data of access logs of a Web server so as to appropriately display the result of analysis.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

The invention claimed is:

1. An access log analyzing method comprising the steps of:
    acquiring an access log from a server to be analyzed;
    totaling the acquired data for each monitored item;
    diagnosing an access status of the server based on the totaled data; and
    providing the result of diagnosis to a requester of the analysis; wherein
    the diagnosing step includes a step of calculating an amount of variation in target data based on the statistic of data within a predetermined period of time for the monitored item, and a step of creating a diagnostic statement with reference to a diagnostic table defining a model of a corresponding diagnostic statement when a significant variation is detected by the step of calculating the amount of the variation in the target data.

2. The access log analyzing method according to claim 1, wherein the calculating step includes a step of obtaining an average and a dispersion for a specified item within a predetermined period of time in the past and a step of calculating a Z value obtained by normalizing a deviation from an average of the target data with a standard deviation based on the average and the dispersion.

3. The access log analyzing method according to claim 1, wherein the diagnosing step includes a step of calculating an amount of variation in the target data based on the statistic of data within a predetermined period of time for the data related to the created diagnostic statement, and a step of creating a sub-diagnostic statement with reference to a sub-diagnostic table describing a model of a corresponding diagnostic statement when a significant variation is detected by the step of calculation an amount of variation in the target data.

4. The access log analyzing method according to claim 1, wherein the diagnosing step includes a step of connecting a plurality of the created diagnostic statements by using a method for finding out a common directory and a statement connection rule table specifying a connection rule of the diagnostic statements.

5. The access log analyzing method according to claim 1, wherein the diagnosing step includes a step of detecting statistical change tendency in the data within a predetermined period of time, and a step of creating a diagnostic statement with reference to a second diagnostic table describing a model of a corresponding diagnostic statement for the statistical change tendency detected by the detecting step.

6. The access log analyzing method according to claim 1, wherein the totaling step includes a step of pre-formatting to customize the data by a search function using a regular expression.

7. The access log analyzing method according to claim 1, further comprising a step of monitoring mutual dependency of processes of the acquiring step, the totaling step, and the diagnosing step so as to manage the execution.

8. The access log analyzing method according to claim 1, wherein
the totaling step includes a step of classifying visitors into new visitors and repeat visitors based on referrer information and further sorting out frequent visitors from the repeat visitors based on the number of visits and the interval of visits; and
the providing step includes a step of displaying a rate of the new visitors, the repeat visitors, and the frequent visitors obtained by the classification as visitor information in a graph in different colors.

9. The access log analyzing method according to claim 1, further comprising a step of acquiring license information of the requester of the analysis so as to determine if a service can be provided or not.

10. A computer-readable medium having an access log analyzing program for making a computer execute at least the procedures of:
acquiring an access log from a server to be analyzed;
totaling the acquired data for each monitored item;
diagnosing an access status of the server based on the totaled data; and
providing the result of diagnosis to a requester of the analysis; wherein
the diagnosing procedure includes a procedure of calculating an amount of variation in target data based on the statistic of data within a predetermined period of time for the monitored item, and a procedure of creating a diagnostic statement with reference to a diagnostic table defining a model of a corresponding diagnostic statement when a significant variation is detected by the procedure of calculating the amount of the variation in the target data.

* * * * *